US 9,033,405 B2

(12) United States Patent
Hirooka

(10) Patent No.: US 9,033,405 B2
(45) Date of Patent: May 19, 2015

(54) STRUCTURE FOR REINFORCING PANEL OF CAR BODY

(75) Inventor: Yasurou Hirooka, Sagamihara (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 13/702,158

(22) PCT Filed: Mar. 29, 2011

(86) PCT No.: PCT/JP2011/057836
§ 371 (c)(1),
(2), (4) Date: Dec. 5, 2012

(87) PCT Pub. No.: WO2011/155249
PCT Pub. Date: Dec. 15, 2011

(65) Prior Publication Data
US 2013/0076077 A1 Mar. 28, 2013

(30) Foreign Application Priority Data
Jun. 7, 2010 (JP) ................................. 2010-129532

(51) Int. Cl.
*B62D 25/20* (2006.01)
*B62D 21/00* (2006.01)

(52) U.S. Cl.
CPC ............... *B62D 21/00* (2013.01); *B62D 25/20* (2013.01); *B62D 25/2036* (2013.01)

(58) Field of Classification Search
CPC ...... B62D 25/20; B62D 21/10; B62D 29/007; B62D 29/008; B60R 13/083; B60R 13/08
USPC ........... 296/193.07, 30, 187.08, 181.1, 184.1, 296/187.01, 190.01, 191, 97.23, 1.03
See application file for complete search history.

(56) References Cited

U.S. PATENT DOCUMENTS

| 1,624,903 | A | * | 4/1927 | Wetzel | 296/204 |
| 4,402,545 | A | * | 9/1983 | Utsunomiya et al. | 296/204 |
| 5,704,644 | A | * | 1/1998 | Jaggi | 280/796 |
| 6,951,366 | B2 | * | 10/2005 | Tomita | 296/187.08 |
| 7,011,359 | B2 | * | 3/2006 | Watanabe et al. | 296/187.08 |

(Continued)

FOREIGN PATENT DOCUMENTS

| EP | 1 814 773 B1 | 3/2010 |
| JP | 4-133260 A | 5/1992 |
| JP | 9-202269 A | 8/1997 |
| JP | 2003-219514 A | 7/2003 |
| JP | 2004-39577 A | 2/2004 |
| JP | 2005-59817 A | 3/2005 |

(Continued)

OTHER PUBLICATIONS

Russian Decision on Grant and English translation dated Apr. 18, 2014, 11 pgs.

*Primary Examiner* — Jason S Morrow
*Assistant Examiner* — E Turner Hicks
(74) *Attorney, Agent, or Firm* — Foley & Lardner LLP

(57) ABSTRACT

A structure for reinforcing a vehicle body panel that constructs a vehicle body, including a keyhole-shaped embossed portion formed by combination of a circular embossed portion and an elongated embossed portion extending from an outer circumference of the circular embossed portion in a radially outward direction of the circular embossed portion. The keyhole-shaped embossed portion is formed to project from one side of the vehicle body panel in a thickness direction of the vehicle body panel toward the other side thereof in the thickness direction thereof.

11 Claims, 6 Drawing Sheets

(56) References Cited

U.S. PATENT DOCUMENTS

| | | |
|---|---|---|
| 7,014,256 B2 * | 3/2006 | Kamura et al. .......... 296/193.07 |
| 7,097,238 B2 * | 8/2006 | Fujita ....................... 296/193.07 |
| 7,104,595 B2 | 9/2006 | Kamura et al. |
| 2010/0156146 A1 * | 6/2010 | Matsuyama ............. 296/193.07 |

FOREIGN PATENT DOCUMENTS

| | | |
|---|---|---|
| JP | 2006-232237 A | 9/2006 |
| JP | 2006-238560 A | 9/2006 |
| RU | 2 384 452 C2 | 3/2010 |
| RU | 51 583 U1 | 3/2010 |

* cited by examiner

STRUCTURE FOR REINFORCING PANEL OF CAR BODY

TECHNICAL FIELD

The present invention relates to a structure for reinforcing a vehicle body panel that constructs a vehicle body.

BACKGROUND ART

In a case where a relatively large load is applied to a vehicle body panel that constructs a vehicle body, it is inevitably necessary to reinforce the vehicle body panel. Upon reinforcing the vehicle body panel in such a case, such a conventional technique as described in Patent Literature 1 has been used in general.

Patent Literature 1 discloses a structure for reinforcing a vehicle body panel, specifically, for reinforcing an underfoot floor panel on which feet of a passenger seated in a rear seat rest and to which a relatively large load is exerted. In the structure as described in Patent Literature 1, the floor panel is provided with a forward-and-rearward bead that extends over a substantially entire length in a forward-and-rearward direction of the vehicle such that the floor panel has a wave form in cross-section to thereby contemplate the reinforcement.

However, in the typical structure for reinforcing a vehicle body panel as described in Patent Literature 1, it is difficult to ensure a sufficient bending strength in a direction of the wave form of the vehicle body panel, and the vehicle body panel tends to be readily deformed upon receiving a bending load in the direction of the wave form. That is, there exists such a directional dependency of degree of reinforcement of the vehicle body panel that a reaction force to a load in a specific direction is large, but a reaction force to a load in another direction is small.

For the above reason, when a thickness of the vehicle body panel is determined, it is necessary to increase a thickness of the panel in order to obtain a predetermined strength of the panel even against a bending load in a direction in which a degree of reinforcement is low. As a result, there occur problems such as an increase in weight and an increase in cost.

In addition, in the general technique of providing the bead extending over the substantially entire length of the vehicle body panel, it is necessary to prepare a panel having a size which is increased by a shrinkage tolerance of the bead in a direction of arrangement of the bead and adjust the size of the panel upon forming the bead so as to comply with the vehicle body panel having a predetermined size. Since the panel having a size larger than that of the vehicle body panel, there will inevitably occur problems such as increase in weight and increase in cost.

Further, in order to reinforce a vehicle body panel, it is also considered that an surface area of the vehicle body panel per se is reduced by adding a fore-and-aft member extending in a forward-and-rearward direction of the vehicle body and a lateral member extending in a width direction of the vehicle body.

However, such addition of the fore-and-aft member and the lateral member causes not only the problems such as increase in weight and increase in cost but also the following problems due to projection of these members toward one side of the vehicle body panel in a thickness direction of the vehicle body panel.

In a case where the vehicle body floor is an underfoot floor panel on which feet of a passenger seated in a rear seat rest and which is required to bear a relatively large load, the problems are explained in detail as follows.

In a case where the fore-and-aft member and the lateral member are additionally provided on an upper side of the underfoot floor panel, an underfoot level (a heel point) at which the passenger's feet rest is raised by heights of these members so that the passenger has a strained feeling upon seating in and leaving the rear seat, or such an uncomfortable feeling that the feet are positioned at an excessively high level when the passenger is in the seated state.

In contrast, in a case where the fore-and-aft member and the lateral member are added to a lower side of the underfoot floor panel, these members are downwardly projected by heights of these members from the underfoot floor panel. Accordingly, in a case where a large-sized battery pack is installed beneath the underfoot floor panel in an electric vehicle such as an electric vehicle and a hybrid vehicle, the battery must be downsized by an amount of projection of the members so that a capacity of the battery is sacrificed.

CITATION LIST

Patent Literature

Patent Literature 1: Japanese Patent Application Unexamined Publication No. 2006-232237

SUMMARY OF INVENTION

An object of the present invention is to provide a structure for reinforcing a vehicle body panel which can realize reinforcement of the vehicle body panel without causing various conventional problems as described above by providing an embossed portion having a specific shape on the vehicle body panel instead of the conventional bead extending over a substantially entire length of the vehicle body panel.

In order to achieve the above object, a structure for reinforcing a vehicle body panel that constructs a vehicle body, according to the present invention, includes a keyhole-shaped embossed portion formed by combination of a circular embossed portion and an elongated embossed portion extending in a radially outward direction of the circular embossed portion, the keyhole-shaped embossed portion being formed to project from one side of the vehicle body panel in a thickness direction of the vehicle body panel toward the other side thereof in the thickness direction.

The structure for reinforcing a vehicle body panel according to the present invention has the following advantages. The circular embossed portion constituting a part of the keyhole-shaped embossed portion can uniformly reinforce the vehicle body panel in every direction extending through a center of the circular embossed portion. Therefore, the vehicle body panel can ensure a predetermined strength with respect to a bending load applying to the vehicle body panel in every direction. There is no directional dependency of degree of reinforcement of the vehicle body panel.

Accordingly, upon determining a thickness of the vehicle body panel, it is not necessary to increase a thickness of the vehicle body panel on the basis of its direction in which a degree of reinforcement of the vehicle body panel is lowered. As a result, it is possible to avoid the above-described problems such as increase in weight and increase in cost which are caused due to an increased thickness of the vehicle body panel.

On the other hand, the circular embossed portion has a drawback that it tends to undergo deformation (i.e., so-called buckling) that causes displacement of a circular bottom surface of the circular embossed portion in the thickness direction. However, in the structure according to the present invention, an embossed portion serving to reinforce the vehicle body panel is not constituted of the circular embossed portion only, but is formed as a keyhole-shaped embossed portion formed by combination of the circular embossed portion and an elongated embossed portion extending from an outer periphery of the circular embossed portion in a radially outward direction of the circular embossed portion. With this construction, the keyhole-shaped embossed portion can suppress the above-described buckling of the circular embossed portion.

Further, the keyhole-shaped embossed portion formed by combination of the circular embossed portion and the elongated embossed portion is independently disposed between sides of the vehicle body panel which are opposed to each other, without extending over the entire length of the vehicle body panel. With this construction, the above-described function can be attained. Therefore, the panel can be prevented from shrinkage upon forming the keyhole-shaped embossed portion, thereby maintaining an outer size thereof without any change. Accordingly, merely by preparing a panel having the same size as that of each of underfoot floor panels 8L, 8R as a final product, it is possible to avoid the above-described problems such as increase in weight and increase in cost which are caused due to an increased size of the panel.

Further, it is possible to attain a predetermined reinforcement of the vehicle body panel without adding the fore-and-aft member and the lateral member as described above. Accordingly, it is possible to avoid the problems such as increase in weight and increase in cost which are caused due to addition of these members. Furthermore, it is possible to avoid such problems that an underfoot level (i.e., a heel point) at which the rear seat passenger's feet rest is raised, and a capacity of a battery pack disposed beneath the vehicle body panel (i.e., an underfoot panel for the rear seat passenger's feet) is sacrificed, which are caused due to projection of these members toward one side of the vehicle body panel in a thickness direction of the vehicle body panel (i.e., an underfoot panel for the rear seat passenger's feet).

BRIEF DESCRIPTION OF DRAWINGS

FIG. 6A is a plan view of the keyhole-shaped embossed portion, in which the keyhole-shaped embossed portion includes two elliptic embossed portions that have a same length and are arranged parallel to each other. FIG. 6B is a plan view of the keyhole-shaped embossed portion, in which the keyhole-shaped embossed portion includes two elliptic embossed portions that have lengths different from each other and are arranged parallel to each other. FIG. 6C is a plan view of the keyhole-shaped embossed portion, in which the keyhole-shaped embossed portion includes two elliptic embossed portions that have a same length and are arranged perpendicular to each other.

DESCRIPTION OF EMBODIMENTS

Figure 1:
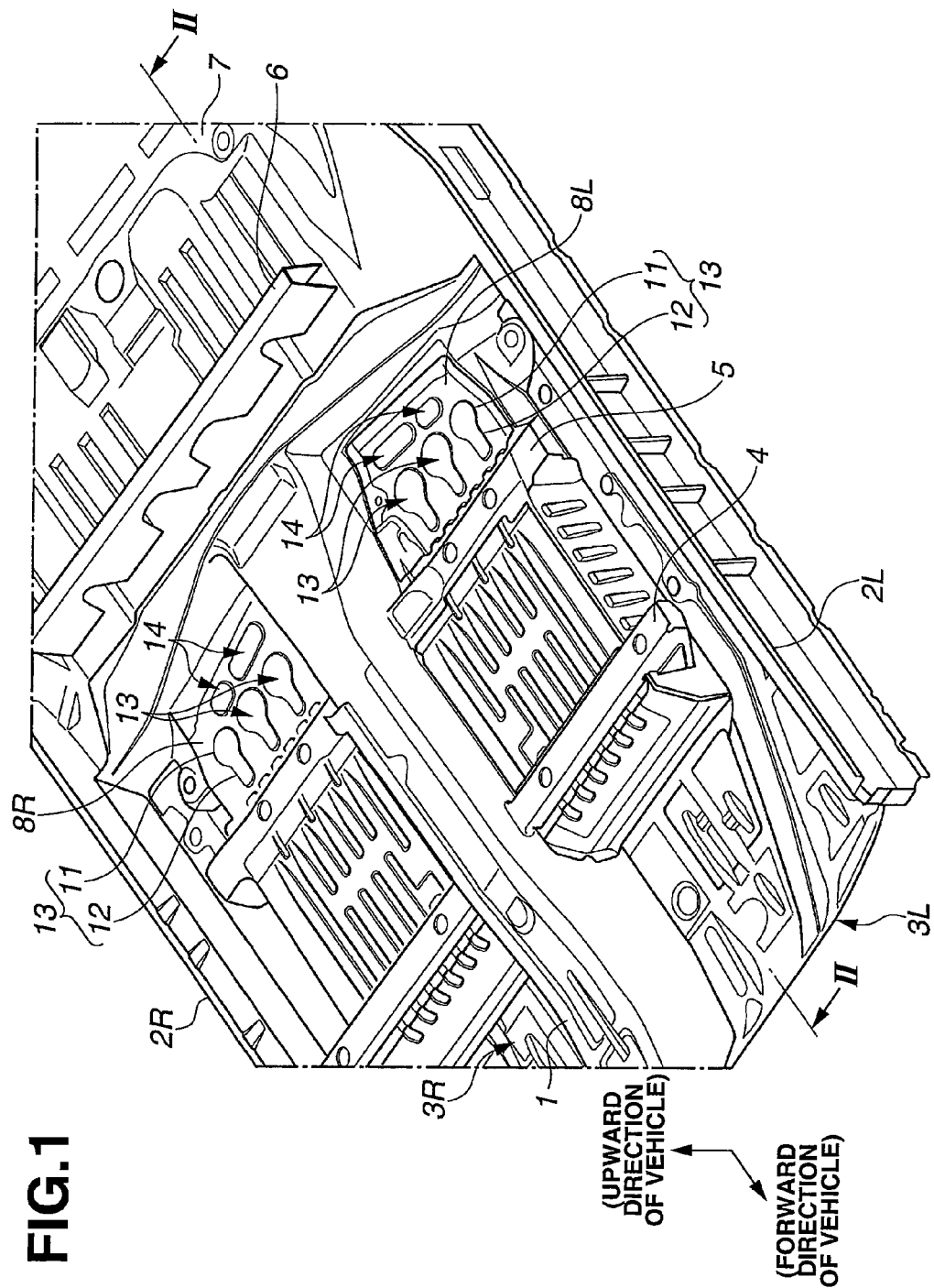
FIG. 1 is a perspective view of a vehicle body floor of an electric vehicle equipped with a vehicle body panel reinforcing structure according to a first embodiment of the present invention, when viewed from a left-upper side of the vehicle.

In the following, preferred embodiments of the present invention are explained in detail by referring to the accompanying drawings. FIG. 1 is a perspective view of a vehicle body floor of an electric vehicle equipped with a vehicle body panel reinforcing structure according to a first embodiment of the present invention, when viewed from a left-upper side of the vehicle. Reference numeral 1 denotes a floor tunnel, and reference signs 2L, 2R denote left and right side sills. Reference signs 3L, 3R denote left and right floor panels (vehicle body panels) which close an aperture between floor tunnel 1 and each of left and right side sills 2L, 2R.

Figure 2:
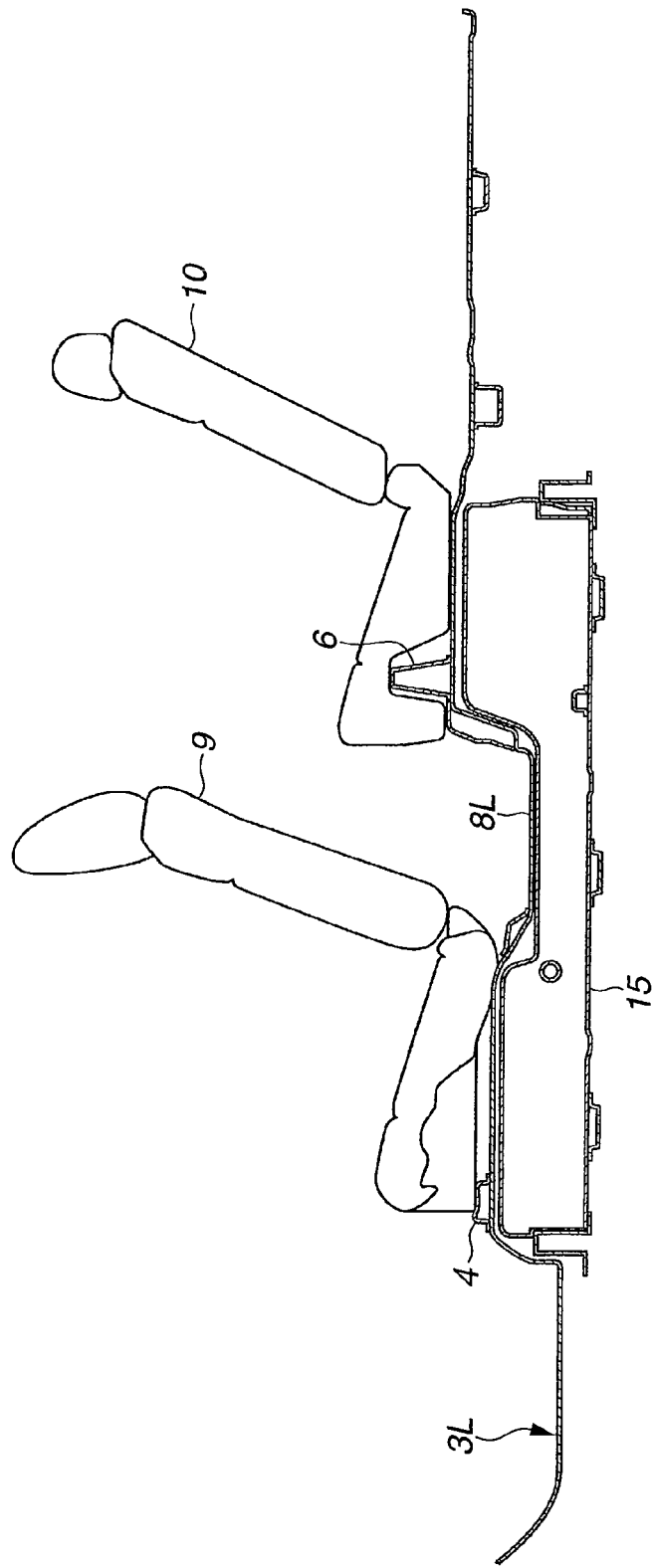
FIG. 2 is a vertical cross-section of the vehicle floor, taken along line II-II as shown in FIG. 1 and viewed in a direction of an arrow, in which a front seat and a rear seat and a battery pack for the electric vehicle are shown together with the vehicle floor.

Cross members 4, 5, 6, 7 extending in a width direction of the vehicle are disposed on left and right floor panels 3L, 3R. As shown in FIG. 2, front seat 9 is mounted onto cross members 4, 5. As shown in FIG. 2, rear seat 10 is mounted onto cross members 6, 7.

Left and right floor panels 3L, 3R are partially formed by left and right rear-seat underfoot floor panels (vehicle body panels) 8L, 8R. Left and right rear-seat underfoot floor panels 8L, 8R on which feet of a passenger seated in rear seat 10 rest, undergo a relatively large load. For this reason, it is necessary to reinforce left and right rear-seat underfoot floor panels 8L, 8R. In this embodiment, these left and right underfoot floor panels 8L, 8R are reinforced particularly in the following manner.

Figure 3:
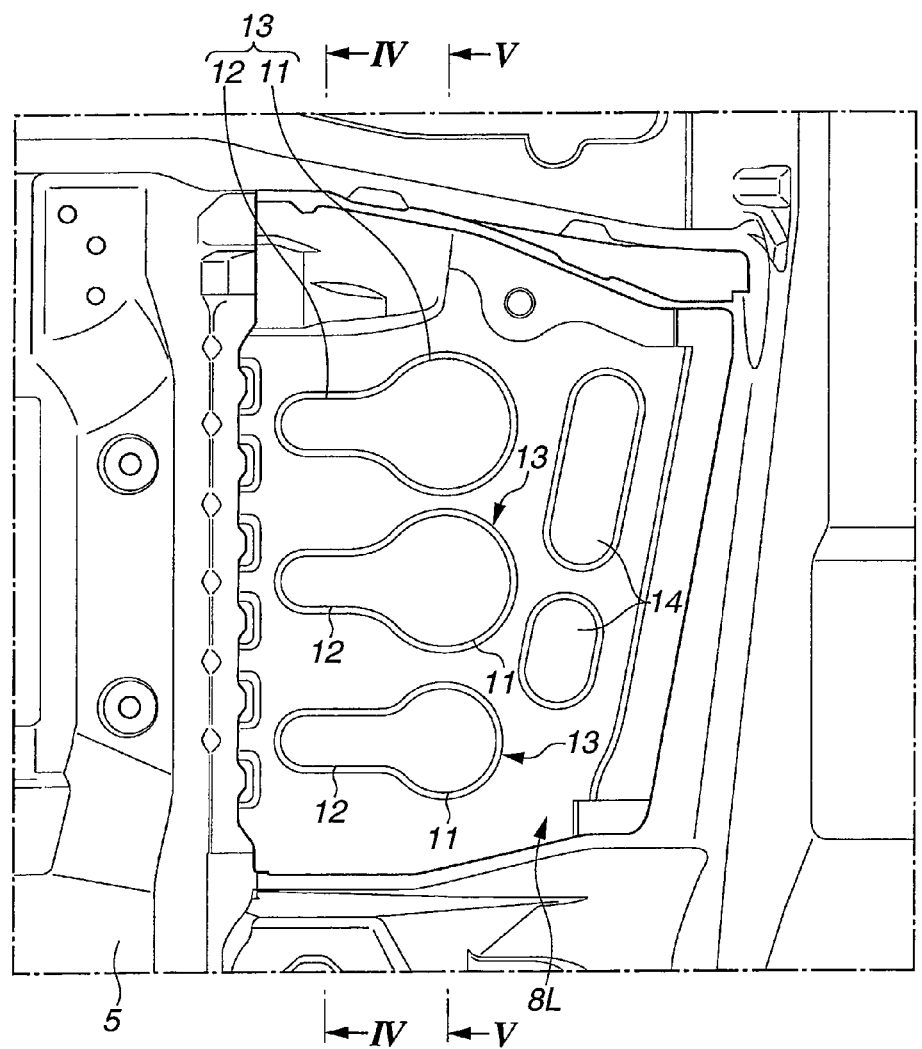
FIG. 3 is an enlarged plan view of a rear seat underfoot floor panel of the vehicle body floor to which the vehicle body panel reinforcing structure according to the first embodiment of the present invention as shown in FIG. 1 is applied.
Figure 4:
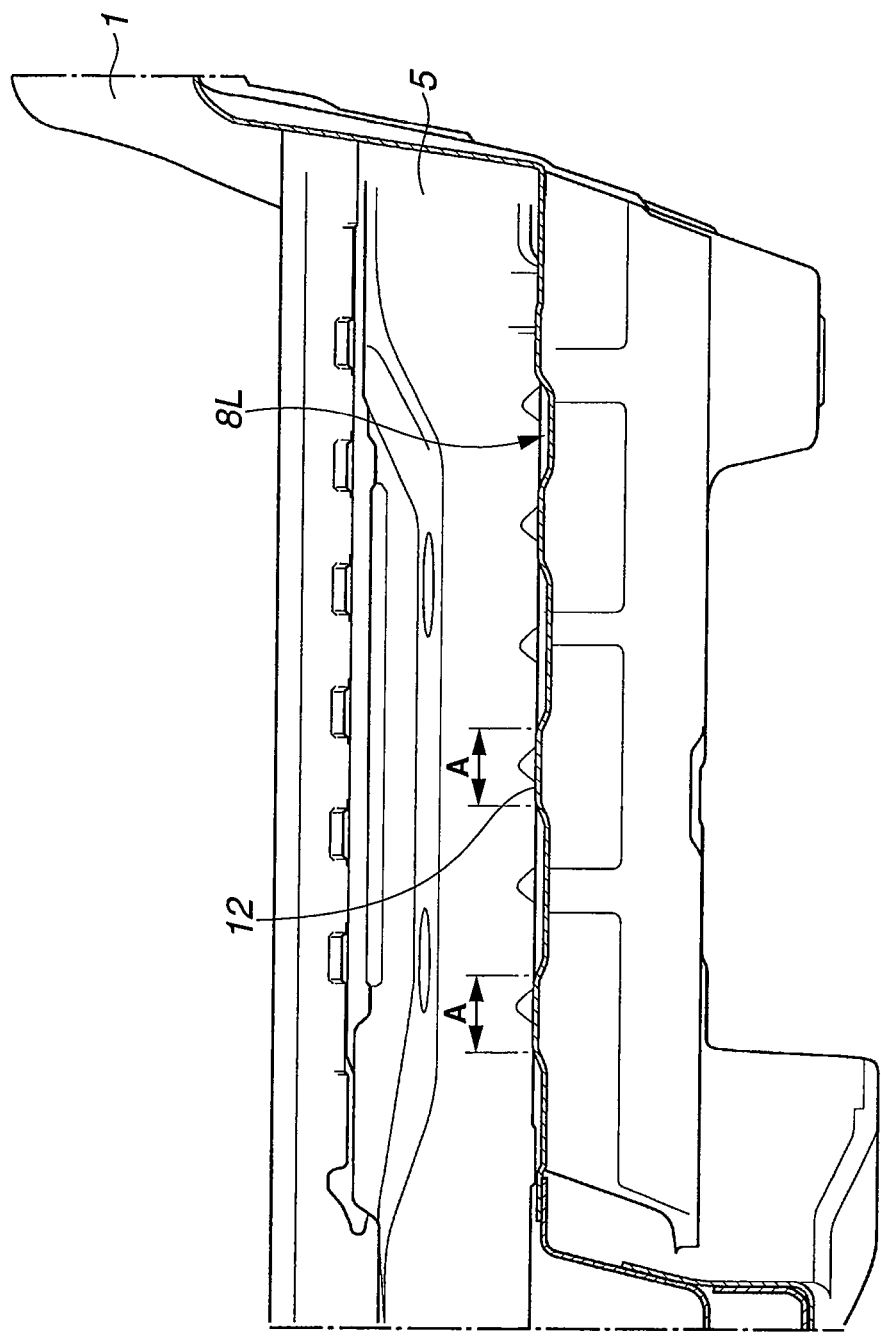
FIG. 4 is a detailed cross-section of the rear seat underfoot floor panel as shown in FIG. 3, taken along line IV-IV of FIG. 3 and viewed in a direction of an arrow.
Figure 5:
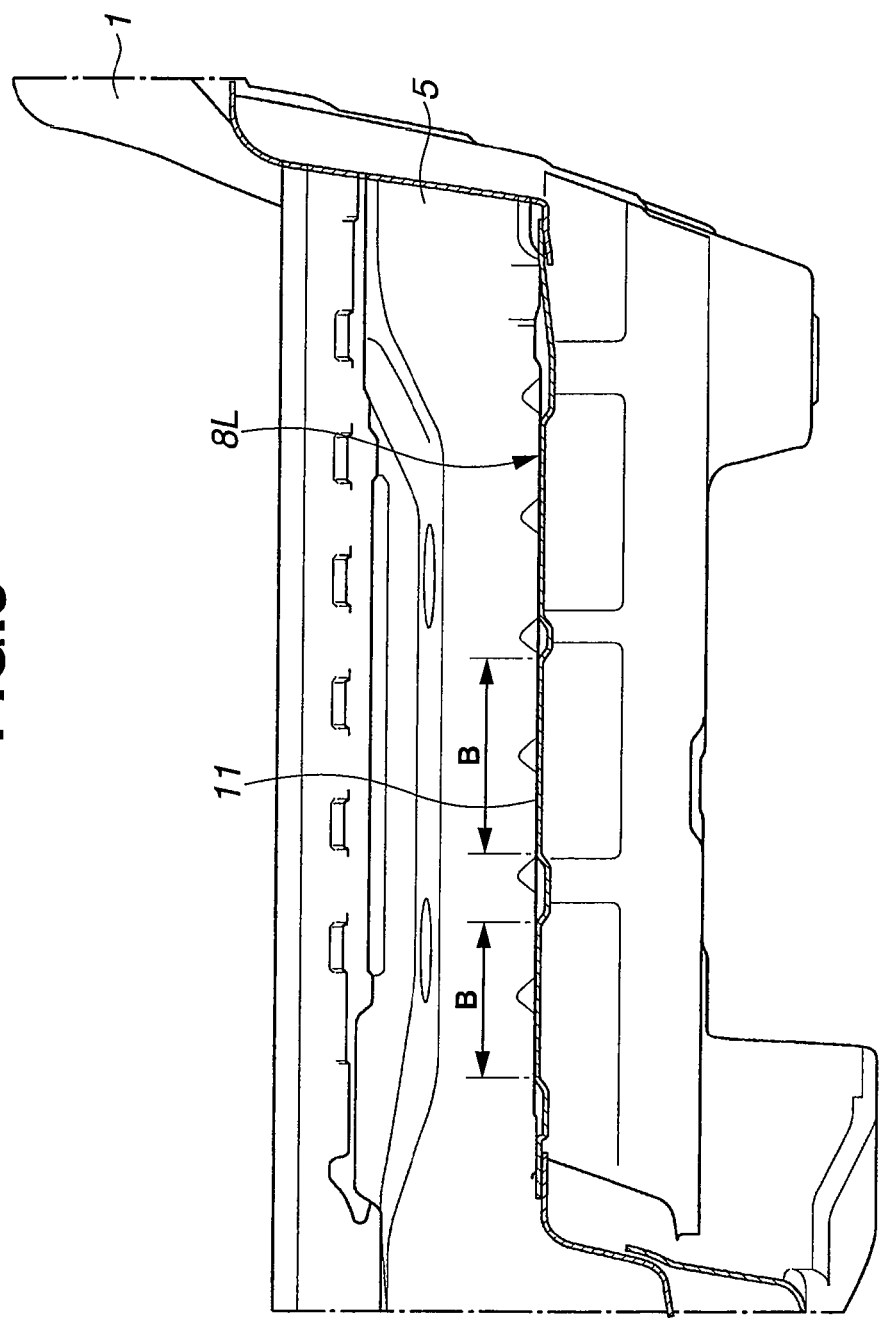
FIG. 5 is a detailed cross-section of the rear seat underfoot floor panel as shown in FIG. 3, taken along line V-V of FIG. 3 and viewed in a direction of an arrow.

Left and right underfoot floor panels 8L, 8R have the same reinforcing construction. The reinforcing construction of left underfoot floor panel 8L will be explained hereinafter by referring to FIGS. 3-5. Underfoot floor panel 8L is formed with embossed portion 13 that is formed by combination of circular embossed portion 11 and elongated embossed portion 12 having an elliptic shape. Elliptic embossed portion 12 has a width A that is smaller than a diameter B of circular embossed portion 11. Elliptic embossed portion 12 is connected to an outer circumference of circular embossed portion 11 and radially outwardly extends from the outer circumference of circular embossed portion 11. Embossed portion 13 thus formed by the combination of these embossed portions 11, 12 has a keyhole-shape as a whole.

Keyhole-shaped embossed portion 13 is arranged such that elliptic embossed portion 12 extends substantially parallel to a short side of underfoot floor panel 8L (i.e., a side extending in a forward-and-rearward direction of the vehicle). Keyhole-shaped embossed portion 13 is configured to project from a lower side of underfoot floor panel 8L in a thickness direction of underfoot floor panel 8L (i.e., from the side of a road surface) toward an upper side thereof in the thickness direction (i.e., toward an inside of a vehicle compartment). Further, keyhole-shaped embossed portion 13 has an entire length as measured in an extension direction of elliptic embossed portion 12 (i.e., in the forward-and-rearward direction of the vehicle) which is shorter than that of underfoot floor panel 8L in the same direction as the extension direction of elliptic embossed portion 12. Keyhole-shaped embossed portions 13 are disposed individually and independently of each other without extending over the entire length of underfoot floor panel 8L in the same direction as the extension direction of elliptic embossed portion 12.

The number of keyhole-shaped embossed portions 13 is set to a number (three in this embodiment) necessary to ensure a required strength of underfoot floor panel 8L and reduce a panel resonance frequency thereof to a frequency (about 100 Hz) required in the electric vehicle. Further, in a case where the panel resonance frequency of underfoot floor panel 8L cannot be adjusted by the number of keyhole-shaped embossed portions 13, upwardly projecting elliptic embossed portions 14 are additionally provided on underfoot floor panel 8L to thereby reduce the panel resonance frequency to the frequency required in the electric vehicle.

In this embodiment, keyhole-shaped embossed portion 13 formed by the combination of circular embossed portion 11 and elliptic embossed portion 12 that has the width A smaller than the diameter B of circular embossed portion 11, is formed to project from the lower side of underfoot floor panels (vehicle body panels) 8L, 8R in the thickness direction of underfoot floor panels 8L, 8R (i.e., from the side of a road surface) toward the upper side thereof in the thickness direction (i.e., toward an inside of the vehicle compartment). With this construction, underfoot floor panels (vehicle body panels) 8L, 8R can be reinforced. As a result, the vehicle body panel reinforcing structure according to this embodiment can attain the following advantages.

Circular embossed portion 11 can serve to uniformly reinforce underfoot floor panels (vehicle body panels) 8L, 8R in every direction extending through a center of circular embossed portion 11. Therefore, underfoot floor panels 8L, 8R have a predetermined strength to a bending load that is applied to underfoot floor panels 8L, 8R in every direction, so that there exists no directional dependency of degree of reinforcement of underfoot floor panels 8L, 8R.

Accordingly, upon determining a thickness of underfoot floor panels 8L, 8R, it is not necessary to increase a thickness of the panel on the basis of its direction in which a degree of reinforcement is lowered. As a result, it is possible to avoid problems such as increase in weight and increase in cost which are caused due to the increased panel thickness.

On the other hand, circular embossed portion 11 has a drawback of easily generating deformation (i.e., so-called buckling) that causes displacement of a circular bottom surface of circular embossed portion 11 in the thickness direction of underfoot floor panels 8L, 8R. However, in this embodiment, embossed portion 13 is constituted of not only circular embossed portion 11 but also elliptic embossed portion 12 radially outwardly extending from the outer circumference of circular embossed portion 11, such that embossed portion 13 is formed as a keyhole-shaped embossed portion in combination of circular embossed portion 11 and elliptic embossed portion 12. With this construction, elliptic embossed portion 12 serves to suppress generation of the above-described buckling in circular embossed portion 11.

Further, keyhole-shaped embossed portion 13 is arranged such that elliptic embossed portion 12 extends substantially parallel to the short side of each of underfoot floor panels 8L, 8R (i.e., the side extending in the forward-and-rearward direction of the vehicle). With this arrangement, elliptic embossed portion 12 can perform a function of resisting a bending load in the fore-and-aft direction of underfoot floor panels 8L, 8R, in addition to the above-described function of suppressing generation of the buckling in circular embossed portion 11. As a result, the strength of underfoot floor panels 8L, 8R can be further reinforced.

Further, the entire length of keyhole-shaped embossed portion 13 as measured in the extension direction of elliptic embossed portion 12 (i.e., in the forward-and-rearward direction of the vehicle) is shorter than that of underfoot floor panels 8L, 8R in the same direction as the extension direction of elliptic embossed portion 12. Without extending beyond the entire length of underfoot floor panels 8L, 8R in the same direction as the extension direction of elliptic embossed portion 12, keyhole-shaped embossed portions 13 are provided individually and independently of each other between the opposed sides of each of underfoot floor panels 8L, 8R which are opposed to each other. Accordingly, the vehicle body panel reinforcing structure according to this embodiment has the following advantages. In a case where keyhole-shaped embossed portions 13 are formed in a panel individually and independently of each other, the panel can be prevented from suffering from shrinkage in every direction so that an outer size of the panel can be maintained without any change. Therefore, it is possible to avoid problems such as increase in weight and increase in cost due to an increased size of the panel merely by preparing a panel having the same size as that of each of underfoot floor panels 8L, 8R as a final product.

Besides, as apparently understood from the above discussion, underfoot floor panels 8L, 8R can be reinforced as desired without adding the fore-and-aft member and the lateral member. Therefore, it is possible to avoid problems such as such as increase in weight and increase in cost due to addition of these members, and prevent these members from projecting toward one side of underfoot floor panels 8L, 8R in the thickness direction of underfoot floor panels 8L, 8R. Accordingly, the vehicle body panel reinforcing structure according to this embodiment has the following advantages.

In a case where the fore-and-aft member and the lateral member are additionally provided on an upper side of underfoot floor panels 8L, 8R, an underfoot level (i.e., a heel point) is raised by heights of these members so that the rear seat passenger has a strained feeling upon seating in and leaving the rear seat, or such an uncomfortable feeling that the feet are positioned at excessively high level when the passenger is in the seated state. However, in this embodiment, underfoot floor panels 8L, 8R can be reinforced as desired without adding the fore-and-aft member and the lateral member thereto. Therefore, the above-described problem is not caused.

Conversely, in a case where the fore-and-aft member and the lateral member are additionally provided on a lower side of underfoot floor panels 8L, 8R, these members downwardly project from underfoot floor panels 8L, 8R by heights of these members so that there occurs the problem that electric vehicle battery pack 15 disposed beneath underfoot floor panels 8L, 8R as shown in FIG. 2 must be downsized to thereby sacrifice the battery capacity. Meanwhile, in FIG. 2, illustration of an internal battery unit is omitted. However, in this embodiment, underfoot floor panels 8L, 8R can be reinforced as desired without adding the fore-and-aft member and the lateral member thereto. Therefore, the above-described problem is not caused.

Furthermore, in this embodiment, keyhole-shaped embossed portion 13 is configured to project from the lower side of underfoot floor panels 8L, 8R in the thickness direction of underfoot floor panels 8L, 8R (i.e., from the side of a road surface) toward the upper side thereof in the thickness direction (i.e., toward an inside of a vehicle compartment). Accordingly, there is no projecting portion projecting toward the lower side in the thickness direction of underfoot floor panels 8L, 8R (i.e., toward the side of a road surface). It is possible to ensure a battery installation space underneath underfoot floor panels 8L, 8R at the maximum, and therefore, cause no sacrifice of the capacity of battery pack 15.

In addition, the number of keyhole-shaped embossed portions 13 is set to a number (three in this embodiment) necessary to ensure a required strength of underfoot floor panels 8L, 8R and reduce a panel resonance frequency thereof to a frequency (about 100 Hz) required in the electric vehicle. With this construction, it is possible to ensure the strength of underfoot floor panels 8L, 8R, and at the same time, realize the panel resonance frequency as required in the electric vehicle.

Other Embodiments

In the embodiment as described above, the structure for reinforcing rear seat underfoot floor panels 8L, 8R of the electric vehicle is explained. However, the vehicle body panel reinforcing structure of the present invention can be applied to not only the electric vehicle but also a hybrid vehicle and a normal vehicle equipped with an internal combustion engine other than these electrically operated vehicles. Further, the vehicle body panel reinforcing structure of the present invention can be applied to not only the vehicle body floor panels such as rear seat underfoot floor panels 8L, 8R but also all vehicle body panels required to be reinforced.

Figure 6A:
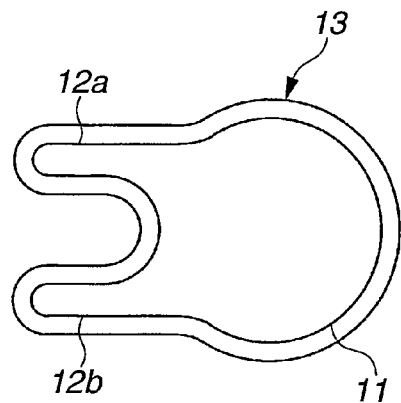
FIG. 6A-6C show keyhole-shaped embossed portions of the vehicle body panel reinforcing structure according to other embodiments of the present invention, respectively.
Figure 6B:
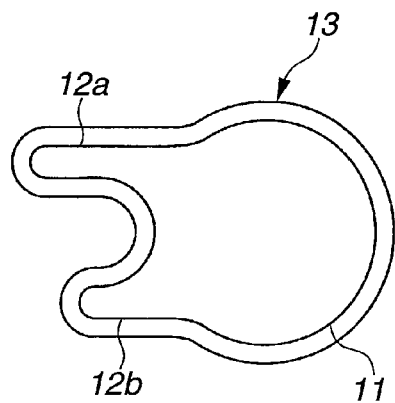
Figure 6C:
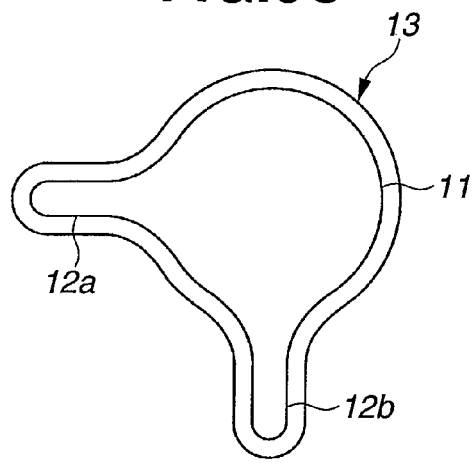

Further, the number of elliptic embossed portions 12 extending radially outwardly from the outer circumference of circular embossed portion 11 is not particularly limited to one as shown in FIGS. 1-5, and a plurality of elliptic embossed portions 12 may be provided. However, in such a case, for example, in a case where two elliptic embossed portions 12a, 12b are provided, as shown in FIGS. 6A, 6B, and 6C, these elliptic embossed portions 12a, 12b are preferably arranged so as not to be diametrically opposed to each other with respect to the center of circular embossed portion 11. Specifically, as shown in FIG. 6A, two elliptic embossed portions 12a, 12b may be formed so as to have a same length, and may be arranged parallel to each other. Furthermore, as shown in FIG. 6B, elliptic embossed portions 12a, 12b may be formed so as to have lengths different from each other, and may be arranged parallel to each other. Further, as shown in FIG. 6C, two elliptic embossed portions 12a, 12b may be formed so as to have a same length, and may be arranged perpendicular to each other.

Figure 7:
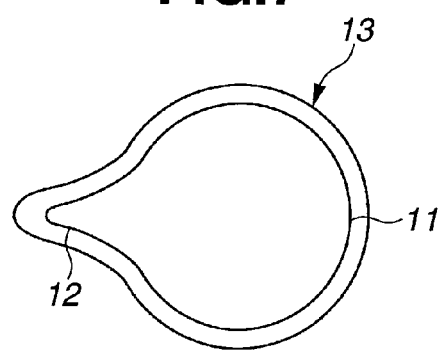
FIG. 7 is a plan view of a keyhole-shaped embossed portion, in which the keyhole-shaped embossed portion of the vehicle body panel reinforcing structure according to another embodiment of the present invention, includes an elongated embossed portion having an isosceles triangular shape different from the elliptic embossed portions as shown in FIGS. 1-6C.

In addition, although the elongated embossed portion is formed as elliptic embossed portions 12, 12a, 12b in the above embodiments, the shape of the elongated embossed portion is not limited to the elliptic shape, and can be formed into an optional elongated shape such as the isosceles triangular shape as shown in FIG. 7.

The invention claimed is:

1. A structure for reinforcing a vehicle body panel that constructs a vehicle body, comprising:
   a keyhole-shaped embossed portion formed by combination of a circular embossed portion and at least one elongated embossed portion extending from an outer circumference of the circular embossed portion in a radially outward direction of the circular embossed portion, the circular embossed portion and the elongated embossed portion being combined such that top surfaces thereof are connected with each other so as to form a continuous flat surface,
   the keyhole-shaped embossed portion being formed to project from one side of the vehicle body panel in a thickness direction of the vehicle body panel toward the other side thereof in the thickness direction thereof,
   wherein the outer circumference of the circular embossed portion is formed of an arc portion provided at a rearward-most facing position of the keyhole-shaped embossed portion with respect to a vehicle forward and rearward direction.

2. The structure for reinforcing a vehicle body panel as claimed in claim 1, wherein the keyhole-shaped embossed portion is formed such that the elongated embossed portion has a width smaller than a diameter of the circular embossed portion.

3. The structure for reinforcing a vehicle body panel as claimed in claim 1, wherein the keyhole-shaped embossed portion is arranged such that the elongated embossed portion extends substantially parallel to a short side of the vehicle body panel.

4. The structure for reinforcing a vehicle body panel as claimed in claim 1, wherein the keyhole-shaped embossed portion has an entire length as measured in an extension direction of the elongated embossed portion which is shorter than that of the vehicle body panel in a same direction as the extension direction of the elongated embossed portion.

5. The structure for reinforcing a vehicle body panel as claimed in claim 1, wherein the vehicle body panel is a vehicle body floor panel that constructs an underfoot floor on which feet of a passenger seated in a rear seat rest, and the keyhole-shaped embossed portion is configured to project from a lower side of the vehicle body floor panel in a thickness direction of the vehicle body floor panel toward an upper side thereof in the thickness direction thereof.

6. The structure for reinforcing a vehicle body panel as claimed in claim 5, wherein a battery installation space in which a battery is installed is provided underneath the vehicle body floor panel.

7. The structure for reinforcing a vehicle body panel as claimed in claim 1, wherein the keyhole-shaped embossed portion is formed by combination of the circular embossed portion and two elongated embossed portions, the two elongated embossed portions being arranged parallel to each other.

8. The structure for reinforcing a vehicle body panel as claimed in claim 1, wherein the keyhole-shaped embossed portion is formed by combination of the circular embossed portion and two elongated embossed portions, the two elongated embossed portions being arranged perpendicular to each other.

9. The structure for reinforcing a vehicle body panel as claimed in claim 7, wherein the two elongated embossed portions have lengths different from each other.

10. The structure for reinforcing a vehicle body panel as claimed in claim 1, wherein the outer circumference of the circular embossed portion is formed of an arc portion of continual curvature extending between opposite sides of a line extending through a center of the circular embossed portion.

11. The structure for reinforcing a vehicle body panel as claimed in claim 5, wherein the keyhole-shaped embossed portion is located on the underfoot floor on which feet of a passenger seated in the rear seat rest.

* * * * *